(No Model.)

C. M. POWERS & W. E. SURFACE.
COMBINATION CLEANING ROD FOR GUNS.

No. 562,416.  Patented June 23, 1896.

Attest.
Helen Graham
William Graham

Inventors
Chauncey M. Powers
and
Wm. E. Surface,
by L. S. Graham
Atty.

UNITED STATES PATENT OFFICE.

CHAUNCEY M. POWERS AND WILLIAM E. SURFACE, OF DECATUR, ILLINOIS.

COMBINATION CLEANING-ROD FOR GUNS.

SPECIFICATION forming part of Letters Patent No. 562,416, dated June 23, 1896.

Application filed March 2, 1896. Serial No. 581,525. (No model.)

*To all whom it may concern:*

Be it known that we, CHAUNCEY M. POWERS and WILLIAM E. SURFACE, citizens of the United States, and residents of the city of Decatur, county of Macon, and State of Illinois, have invented a certain Combined Cleaning-Rod, Screw-Driver, and Oil-Can, of which the following is a specification.

This invention consists in bringing a cleaning-rod, a screw-driver, and an oil-can, three prominent features of a gunner's outfit, into such correlation that the screw-driver and oil-can will form the handle of the rod, the screw-driver blade will be sheathed in the rod, and the nozzle of the oil-can will be incased in and protected by the handle part of the screw-driver.

The invention is exemplified in the structure hereinafter described, and it is defined in the appended claims.

Figure 1:
Figure 2:
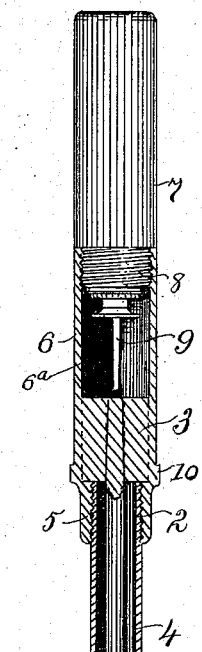
Figure 3:
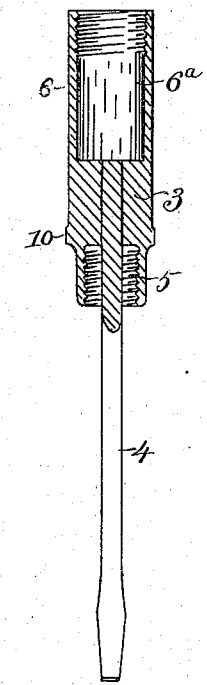

In the drawings forming part of this specification, Figure 1 is a representation of the handle end of a cleaning-rod for guns and the handle thereof. Fig. 2 is a similar delineation showing parts in longitudinal section. Fig. 3 is a longitudinal section through one of the parts of which the handle is composed.

The cleaning-rod 1 is tubular, at its handle end at least. It is supplied with the usual or any desirable cleaning device or devices, and it is externally threaded at 2, in this particular instance. The handle consists in part of the shell-like portion 6, having a core 3 so located as to form a long compartment 6ª in one end of the shell and a shorter compartment 5 in the opposite end. Both compartments are threaded, the threads being preferably internal. The compartment 5 is diminished to conform to the diameter of the rod 1, and a screw-driver blade 4 is fastened in the core 3 in a manner to extend through the compartment 5 and along the longitudinal axis of the shell and the rod. The other part of the handle consists of an oil-can 7, threaded at 8 to conform to the threads of the compartment 6ª, and having its nozzle 9 extended into such compartment. The shell that forms the screw-driver handle is preferably supplied with a milled surface, as 10, the better to develop friction.

When it is desired to use the screw-driver, the driver and can may be unscrewed from the rod and be used as one device, and the oil-can may be readily unscrewed from the screw-driver shell whenever it is desired to use oil.

A handle of some kind is necessary for the cleaning-rod. A screw-driver and an oil-can are part of a gunner's equipment, and by forming the handle out of the can and the driver a saving is effected, the parts are always available when needed, and the screw-driver blade and the oil-can nozzle are protected by reason of their positions in their respective cavities.

Having thus described our invention, we claim as new and desire to secure by Letters Patent—

1. The combination of a tubular gun-rod having screw-threads at its handle end, a shell having screw-threads conforming to the threads of the rod, a core in the shell, and a screw-driver blade fastened in the core and adapted to extend into the rod when the shell is screwed onto the rod, substantially as set forth.

2. The combination of a tubular gun-rod having screw-threads at its handle end, a shell screw-threaded at both ends, a core in the shell dividing the same into two compartments, a screw-driver blade fastened in the core and adapted to extend into the rod, and an oil-can screw-threaded at its nozzle end and adapted to be screwed into the shell, substantially as set forth.

3. A gun-rod, a screw-driver and an oil-can connected together with the screw-driver blade inserted into the rod and the oil-can nozzle incased in the handle of the screw-driver, whereby the can and driver form a handle for the rod.

In testimony whereof we sign our names in the presence of two subscribing witnesses.

CHAUNCEY M. POWERS.
WM. E. SURFACE.

Witnesses:
T. A. POWERS,
L. P. GRAHAM.